US008032838B2

(12) United States Patent
Sze et al.

(10) Patent No.: US 8,032,838 B2
(45) Date of Patent: Oct. 4, 2011

(54) SYSTEM AND METHOD FOR PROCESSING AND RENDERING MARKUP LANGUAGE BASED ELECTRONIC MAIL

(75) Inventors: David Sze, Waterloo (CA); Gerhard D. Klassen, Waterloo (CA); David Tapuska, Waterloo (CA)

(73) Assignee: Research In Motion Limited, Waterloo (CA)

( * ) Notice: Subject to any disclaimer, the term of this patent is extended or adjusted under 35 U.S.C. 154(b) by 841 days.

(21) Appl. No.: 12/031,337

(22) Filed: Feb. 14, 2008

(65) Prior Publication Data

US 2009/0210805 A1   Aug. 20, 2009

(51) Int. Cl.
*G06F 13/00*     (2006.01)
*G06F 15/00*     (2006.01)

(52) U.S. Cl. ........................ 715/763; 715/760
(58) Field of Classification Search .......... 715/736–739, 715/740–745, 763–765, 851–854
See application file for complete search history.

(56) References Cited

U.S. PATENT DOCUMENTS

2002/0169835 A1*  11/2002  Paul et al. ................. 709/206
2003/0231207 A1*  12/2003  Huang ....................... 345/752
2006/0010201 A1*   1/2006  Roskowski et al. ........ 709/204

OTHER PUBLICATIONS

"HTML Email Tips for Web Designers", Internet Article, [Online] Jan. 18, 2006, XP002494557 Retrieved from the Internet: URL:http://www.mailchimp.com/blog/html-email-tips-for-web-designers/> [retrieved on Sep. 4, 2008] * section "HTML Design and Coding Tips" *.

Quint V et al: "Editing with Style" Proceedings of the 2007 ACM Symposium on Document Engineering, [Online] Aug. 28, 2007-Aug. 31, 2007, pp. 151-160, XP002494558; Winnipeg, Manitoba, Canada Retrieved from the Internet: URL:http://delivery.acm.org/10.1145/1290000/1284460/p151-quint.pdf?key1=1284460& key2=4453350221&coll=GUIDE&dl=GUIDE&CFID=1606820& CFTOKEN=98025098> [retrieved on Sep. 4, 2008] * abstract * *section 2. "Analysis" *.

Hassan A Artail et al: "Device-aware desktop web page transformation for rendering on handhelds" Personal and Ubiquitous Computing, Springer Verlag, LO, vol. 9, No. 6, Dec. 1, 2005, pp. 368-380, XP019381451, ISSN: 1617-4917 * p. 369, right-hand column, line 3—p. 372, left-hand column, line 21 *.

* cited by examiner

*Primary Examiner* — Cao Kevin Nguyen
(74) *Attorney, Agent, or Firm* — Geoffrey deKleine; Borden Ladner Gervais LLP

(57) ABSTRACT

A system and method of processing a markup language based electronic mail includes identifying in a head section of markup language code any style rules for rendering the markup language based e-mail and sorting the style rules in order of reference in the markup language code, interleaving the style rules for placement in a body section of one or more blocks of markup language code corresponding to one or more sections of the markup language based e-mail, wherein interleaving is based on predetermined rules, and storing the one or more blocks of markup language code including the interleaved style rules as separately downloadable blocks of data corresponding to sections of the markup language based e-mail. The method may also include receiving, at a mobile communication device, a block of markup language code for rendering a section of the markup language based e-mail on a display, identifying in the block of markup language code any style rules interleaved therein for rendering the section of the markup language based e-mail on the display, processing the interleaved style rules identified in the block of markup language code, and rendering the section of the markup language based e-mail on the display based on the processed style rules.

20 Claims, 12 Drawing Sheets

```
<html>
<head>
<title>Rule limits</title>
<style>
  .c1 { color: white; }
  .c2 { color: yellow; }
  .c3 { color: orange; }
  .c4 { color: red; }
  .c5 { color: green; }
  .c6 { color: blue; }
  .c7 { color: purple; }
</style>
</head>

<body>
  <p class="c1">This should be white.</p>
  <p class="c2">This should be yellow.</p>
  <p class="c3">This should be orange.</p>
  <p class="c4">This should be red.</p>
  <p class="c5">This should be green.</p>
  <p class="c6">This should be blue.</p>
  <p class="c7">This should be purple.</p>
</body>
</html>
```

---

```
<html>
<head>
<title>Rule limits</title>
</head>

<body>
  <style>
    .c1 { color: white; }
    .c2 { color: yellow; }
    .c3 { color: orange; }
    .c4 { color: red; }
    .c5 { color: green; }
    .c6 { color: blue; }
  </style>
  <p class="c1">This should be white.</p>
  <p class="c2">This should be yellow.</p>
  <p class="c3">This should be orange.</p>
  <p class="c4">This should be red.</p>
  <p class="c5">This should be green.</p>
  <p class="c6">This should be blue.</p>
  <style>
    .c7 { color: purple; }
  </style>
  <p class="c7">This should be purple.</p>
</body>
</html>
```

502 — first style block (.c1–.c7)
504 — second style block (.c1–.c6)
506 — .c7 { color: purple; }

FIG. 5 — 500

```html
<html>
<head>
<title>Text limits</title>
<style>
.c1 { color: white; }
.c2 { color: yellow; }
.c3 { color: orange; }
.c4 { color: red; }
.c5 { color: green; }
.c6 { color: blue; }
.c7 { color: purple; }
</style>
</head>

<body>
  <p class="c1">[... 128 characters of text ...]</p>
  <p class="c2">[... 128 characters of text ...]</p>
  <p class="c3">This should be orange.</p>
  <p class="c4">This should be red.</p>
  <p class="c5">This should be green.</p>
  <p class="c6">This should be blue.</p>
  <p class="c7">This should be purple.</p>
</body>
</html>
```

602 → the .c1–.c7 style block above

```html
<html>
<head>
<title>Text limits</title>
</head>

<body>
  <style>
  .c1 { color: white; }
  .c2 { color: yellow; }
  </style>
  <p class="c1">[... 128 characters of text ...]</p>
  <p class="c2">[... 128 characters of text ...]</p>
  <style>
  .c3 { color: orange; }
  .c4 { color: red; }
  .c5 { color: green; }
  .c6 { color: blue; }
  .c7 { color: purple; }
  </style>
  <p class="c3">This should be orange.</p>
  <p class="c4">This should be red.</p>
  <p class="c5">This should be green.</p>
  <p class="c6">This should be blue.</p>
  <p class="c7">This should be purple.</p>
</body>
</html>
```

604 → .c1/.c2 style block
606 → .c3–.c7 style block

FIG. 6 — 600

```html
<html>
<head>
<title>Block and Inline Elements (Soft Rule Limits)</title>
<style>
  .c1 { color: white; }
  .c2 { color: yellow; }
  .c3 { color: orange; }
  .c4 { color: red; }
  .c5 { color: green; }
  .c6 { color: blue; }
  .c7 { color: purple; }
</style>
</head>

<body>
 <div>
   <span class="c1">This should be white.</span>
   <span class="c2">This should be yellow.</span>
   <span class="c3">This should be orange.</span>
   <span class="c4">This should be red.</span>
   <span class="c5">This should be green.</span>
   <span class="c6">This should be blue.</span>
   <span class="c7">This should be purple.</span>
 </div>
</body>
</html>
```

```html
<html>
<head>
<title>Block and Inline Elements (Soft Rule Limits)</title>
</head>

<body>
 <style>
   .c1 { color: white; }
   .c2 { color: yellow; }
   .c3 { color: orange; }
   .c4 { color: red; }
   .c5 { color: green; }
   .c6 { color: blue; }
   .c7 { color: purple; }
 </style>
 <div>
   <span class="c1">This should be white.</span>
   <span class="c2">This should be yellow.</span>
   <span class="c3">This should be orange.</span>
   <span class="c4">This should be red.</span>
   <span class="c5">This should be green.</span>
   <span class="c6">This should be blue.</span>
   <span class="c7">This should be purple.</span>
 </div>
</body>
</html>
```

FIG. 7

```
<html>
<head>
<title>Block and Inline Elements (Soft Text Limits)</title>
<style>
  .c1 { color: white; }
  .c2 { color: yellow; }
  .c3 { color: orange; }
  .c4 { color: red; }
  .c5 { color: green; }
  .c6 { color: blue; }
</style>
</head>

<body>
  <p class="c1">
  [... 256 characters of text ...]
  <b>This should be white and bold.</b>
  </p>
  <p class="c2">This should be yellow.</p>
  <p class="c3">This should be orange.</p>
  <p class="c4">This should be red.</p>
  <p class="c5">This should be green.</p>
  <p class="c6">This should be blue.</p>
</body>
</html>
```

802 — brackets .c1 through .c6

```
<html>
<head>
<title>Block and Inline Elements (Soft Text Limits)</title>
</head>

<body>
  <style>
    .c1 { color: white; }
  </style>
  <p class="c1">
  [... 256 characters of text ...]
  <b>This should be white and bold.</b>
  </p>
  <style>
    .c2 { color: yellow; }
    .c3 { color: orange; }
    .c4 { color: red; }
    .c5 { color: green; }
    .c6 { color: blue; }
  </style>
  <p class="c2">This should be yellow.</p>
  <p class="c3">This should be orange.</p>
  <p class="c4">This should be red.</p>
  <p class="c5">This should be green.</p>
  <p class="c6">This should be blue.</p>
</body>
</html>
```

804 — .c1 { color: white; }
806 — .c2 through .c6

FIG. 8 — 800

```html
<html>
<head>
<title>Global styles that can't be interleaved</title>
<style>
  body { background-color: black; }
  :link { color: white; }
  :visited { color: red; }
  .c1 { font-size: 12pt; }
  .c2 { font-size: 24pt; }
</style>
</head>

<body>
  <div class="c1">This should be 12pt font.</div>
  <div class="c2">This should be 14pt font.</div>
</body>
</html>
```

```html
<html>
<head>
<title>Global styles that can't be interleaved</title>
<style>
  body { background-color: black; }
  :link { color: white; }
  :visited { color: red; }
</style>
</head>

<body>
  <style>
    .c1 { font-size: 12pt; }
    .c2 { font-size: 24pt; }
  </style>
  <div class="c1">This should be 12pt font.</div>
  <div class="c2">This should be 14pt font.</div>
</body>
</html>
```

FIG. 9

SYSTEM AND METHOD FOR PROCESSING AND RENDERING MARKUP LANGUAGE BASED ELECTRONIC MAIL

FIELD OF THE INVENTION

The present disclosure relates generally to markup language (e.g. HyperText Markup Language (HTML)) based electronic mail (e-mail), and more particularly to processing and rendering HTML e-mail for display on wireless handheld devices.

BACKGROUND

Enhanced e-mail containing markup language (e.g. HTML e-mail) has been increasing in popularity due to its enhanced appearance and functionality. In comparison to text only e-mail, HTML e-mail allows the sender to display richer fonts, colors, borders, backgrounds, graphic designs and other enhanced visual features. However, HTML e-mail consumes significantly more processing and memory resources for rendering them for display.

When attempting to display HTML e-mail on devices with limited system or bandwidth resources, such as wireless handheld devices, rendering HTML e-mail may take a significant amount of time, resulting in a noticeable delay and a poor user experience. What is needed is an improved system and method for rendering HTML e-mail, particularly on resource limited devices.

BRIEF DESCRIPTION OF THE DRAWINGS

In the figures which illustrate exemplary embodiments:

FIGS. 5 to 9 are illustrative examples of blocks of HTML code including various interleaved style rules.

DETAILED DESCRIPTION

As noted above, the present disclosure relates to a system and method for processing and rendering HTML e-mail, particularly on resource limited devices such as wireless handheld devices.

Figure 1:
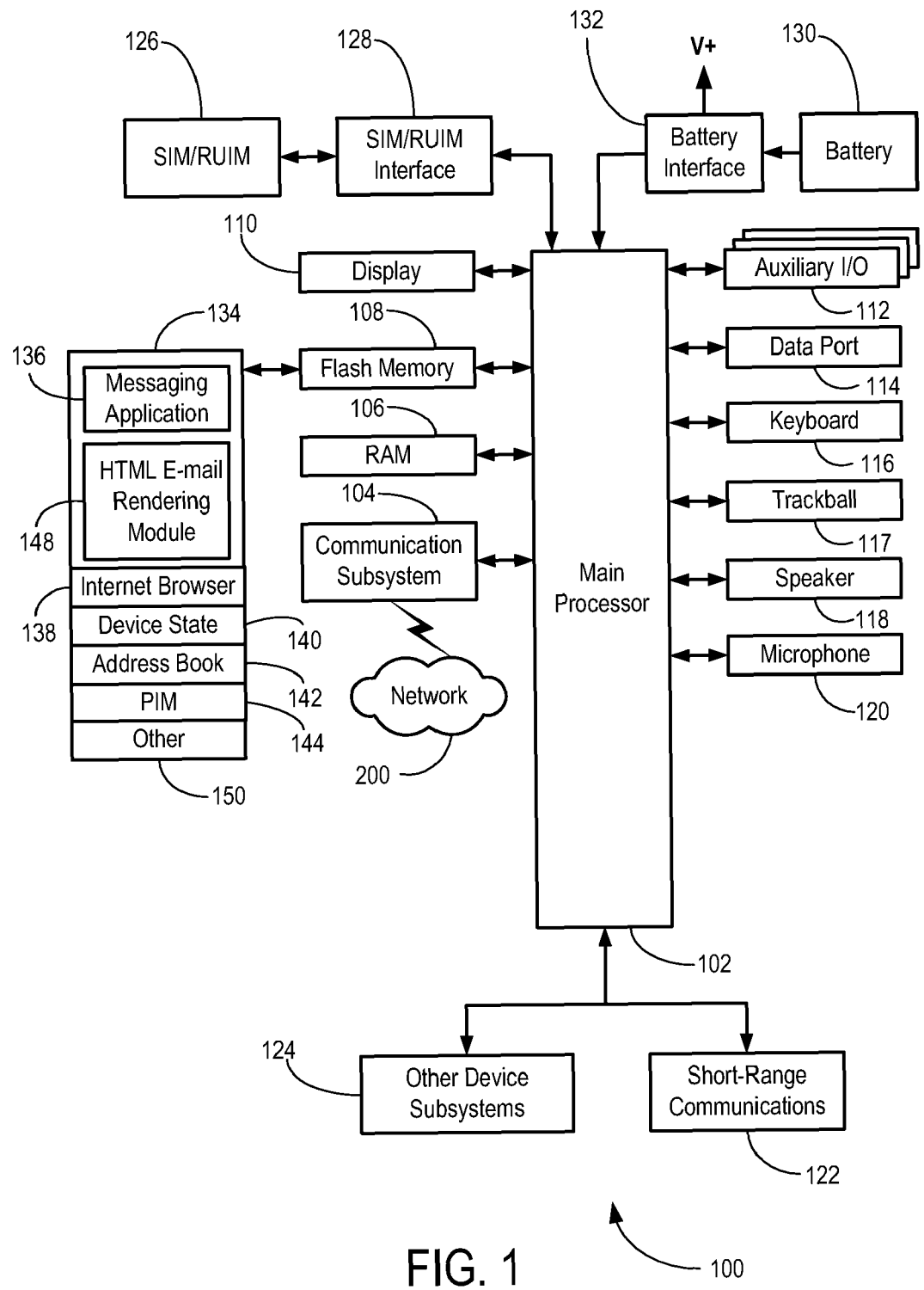
FIG. 1 is a schematic block diagram of various components of a wireless handheld device.

In an illustrative embodiment, the system and method may be practiced with a wireless handheld device in a wireless operating environment. Shown in FIG. 1 is a schematic block diagram of an illustrative wireless handheld device 100. The wireless handheld device 100 may comprise a number of components, including a main processor 102 which controls the overall operation of wireless handheld device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, and other device subsystems 124.

Some of the subsystems of the wireless handheld device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The wireless handheld device 100 may send and receive communication signals over the wireless network 200 after required network registration or activation procedures have been completed. Network access may be associated with a subscriber or user of the wireless handheld device 100.

The wireless handheld device 100 may be a battery-powered device and may include a battery interface 132 for receiving one or more rechargeable batteries 130.

The main processor 102, in addition to its operating system functions, enables execution of various software applications 134 on the wireless handheld device 100. A subset of software applications 134 that control basic device operations, including data and voice communication applications, will normally be installed on the wireless handheld device 100 during its manufacture.

The software applications 134 may include a messaging application 136. The messaging application 136 can be any suitable software program that allows a subscriber or user of the wireless handheld device 100 to send and receive wireless text communications. Various alternatives exist for the messaging application 136 as is well known to those skilled in the art. Messages that have been sent or received by the user are typically stored in local storage such as flash memory 108 of the wireless handheld device 100, or in some other suitable storage element in the wireless handheld device 100. In an alternative embodiment, some of the sent and received messages may be stored remotely from the wireless handheld device 100 such as in a data store of an associated host system that the wireless handheld device 100 communicates with. In an embodiment, the messaging application 136 may include a Message List user interface that is configured to allow a user to see a list of message objects (i.e. e-mail messages) in a convenient list form.

The wireless handheld device 100 may further include a device state module 140, an address book 142, a Personal Information Manager (PIM) 144, and various other modules 150. Additional software applications may also be loaded onto the wireless handheld device 100 through at least one of the wireless network 200, the auxiliary I/O subsystem 112, the data port 114, the short-range communications subsystem 122, or the various other device subsystems 124.

Still referring to FIG. 1, wireless handheld device 100 may include an HTML e-mail rendering module 148 which is operatively integrated with messaging application 136 and Internet browser 138. HTML e-mail rendering module 148 and its various functions will be described in more detail further below.

Figure 2:
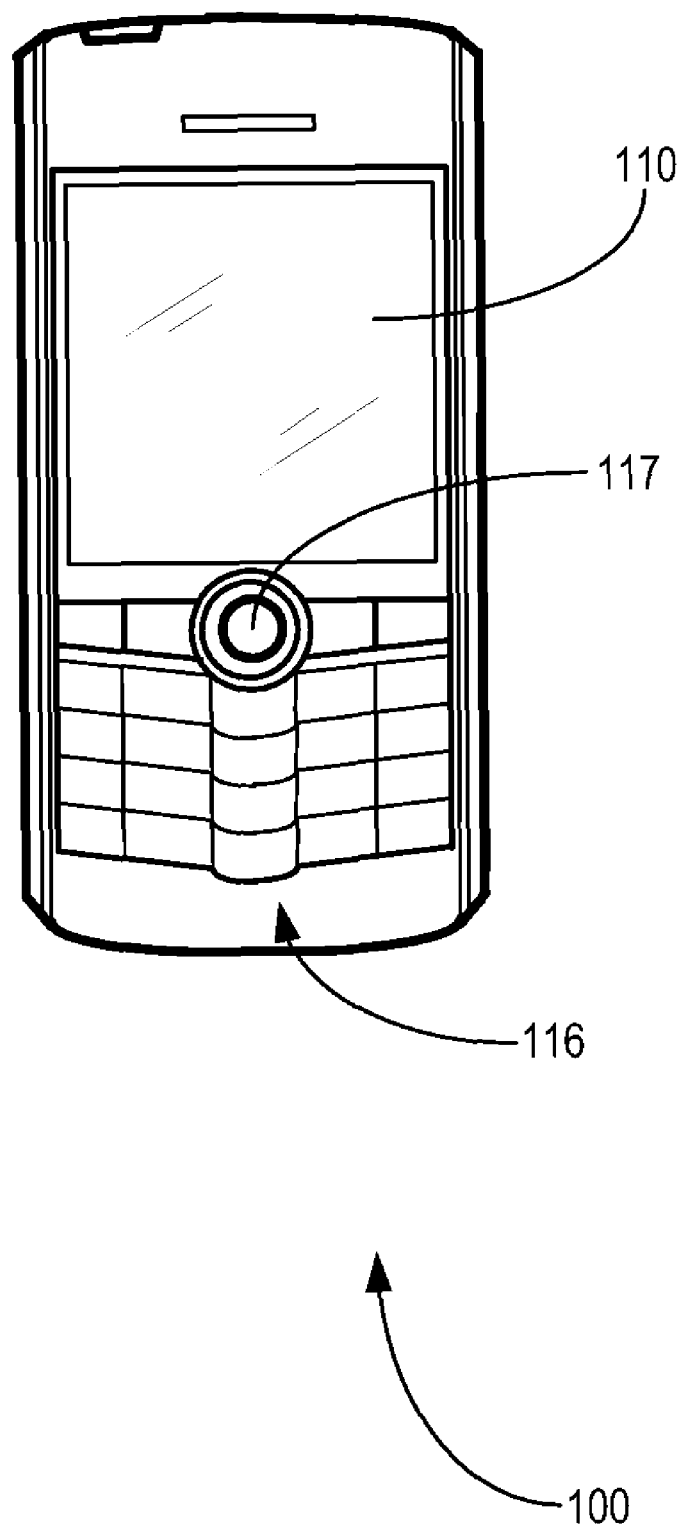
FIG. 2 is an illustrative front view of a wireless handheld device containing the components of FIG. 1.

Now referring to FIG. 2, shown is an illustrative front view of a wireless handheld device 100 that may provide a suitable operating environment. As shown, the wireless handheld device 100 may include a display 110, a keyboard 116, and other input or navigation means such as a trackball 117. The display 110 may support a GUI interface and may be configured to display screen outputs from the various software applications 134, including the HTML e-mail rendering module 148. Thus, display 110 may show various fonts, colors, borders, backgrounds, graphic designs and other enhanced visual features as may be found in an HTML e-mail. Display 110 may also be configured to provide a touch-sensitive screen input in response to a prompt or query displayed on display 110.

Figure 3:
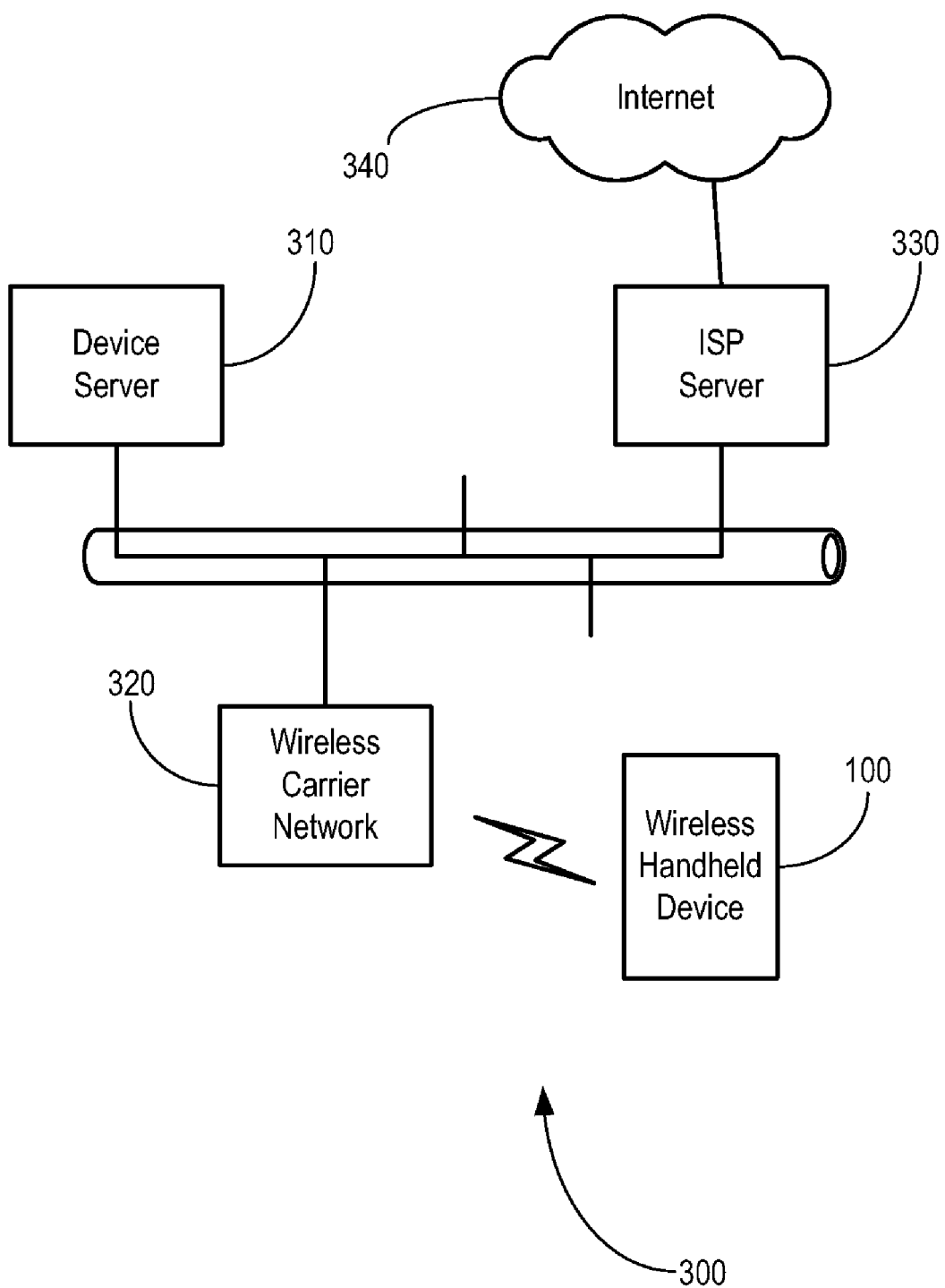
FIG. 3 is a schematic block diagram of an illustrative example of a network environment in which various embodiments may be practiced.

Now referring to FIG. 3, shown is a schematic block diagram of an illustrative network environment 300 in which various embodiments may be practiced. As shown, network environment 300 may include a device server 310 operatively connected to the wireless handheld device 100 via a wireless carrier network 320. An Internet Service Provider (ISP) server 330 may also be provided in the network environment 300 such that a user of device 100 may access the Internet 340 using Internet browser 138 on device 100.

Figure 4A:
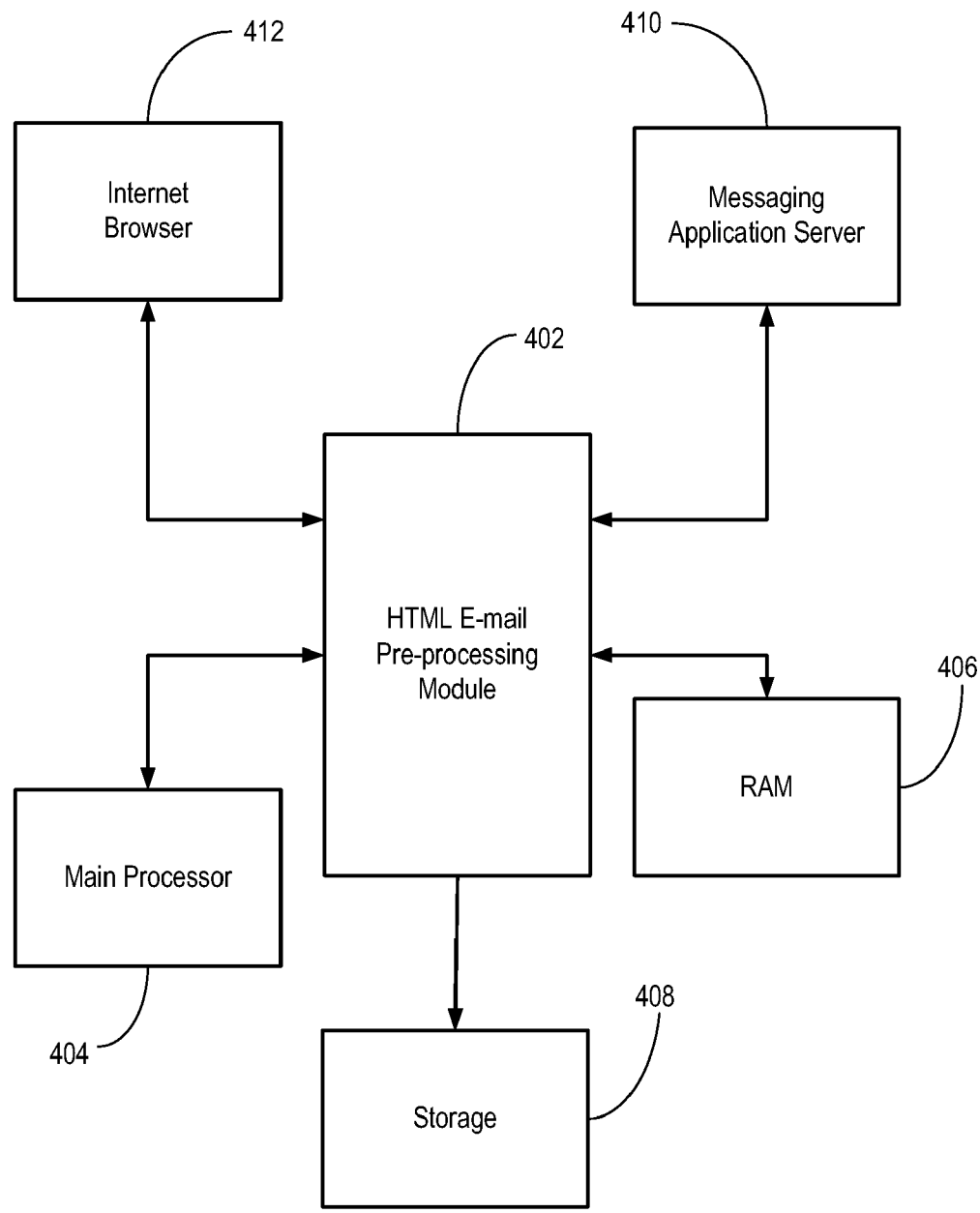
FIGS. 4A and 4B are schematic block diagrams of an illustrative system for processing and rendering HTML e-mail in accordance with an embodiment.

Now referring to FIG. 4A, shown is a schematic block diagram of an illustrative system 400A for preprocessing an HTML e-mail in accordance with an embodiment. As shown, system 400A includes an HTML e-mail preprocessing module 402. As shown, system 400A includes various components within device server 310, including a main processor 404, RAM 406, and storage 408. System 400A may further include a messaging application server 410, and an Internet browser module 412. HTML e-mail preprocessing module 402 may be operatively connected to or integrated with message application server 410 and Internet browser module 412. HTML e-mail preprocessing module 402 is also operatively connected to main processor 404, RAM 406, and storage 408.

In an embodiment, HTML e-mail preprocessing module 402 may be configured to preprocess HTML e-mail received at device server 310 by identifying HTML style rules provided in the <head> section of the HTML code, and interleaving the style rules into one or more <style> sections provided in different blocks of HTML code. This style rule interleaving process will be described in more detail further below with reference to FIGS. 5 to 9. As will be explained, this style rule interleaving process may significantly improve rendering speed for displaying HTML e-mail on the wireless handheld device 100.

Note that HTML e-mail preprocessing module 402 may be adapted to include a normalization step, first converting non-standard HTML to a standard, accepted format. These normalization steps are described in more detail in co-pending U.S. patent application Ser. No. 12/031,083, filed Feb. 14, 2008.

Figure 4B:
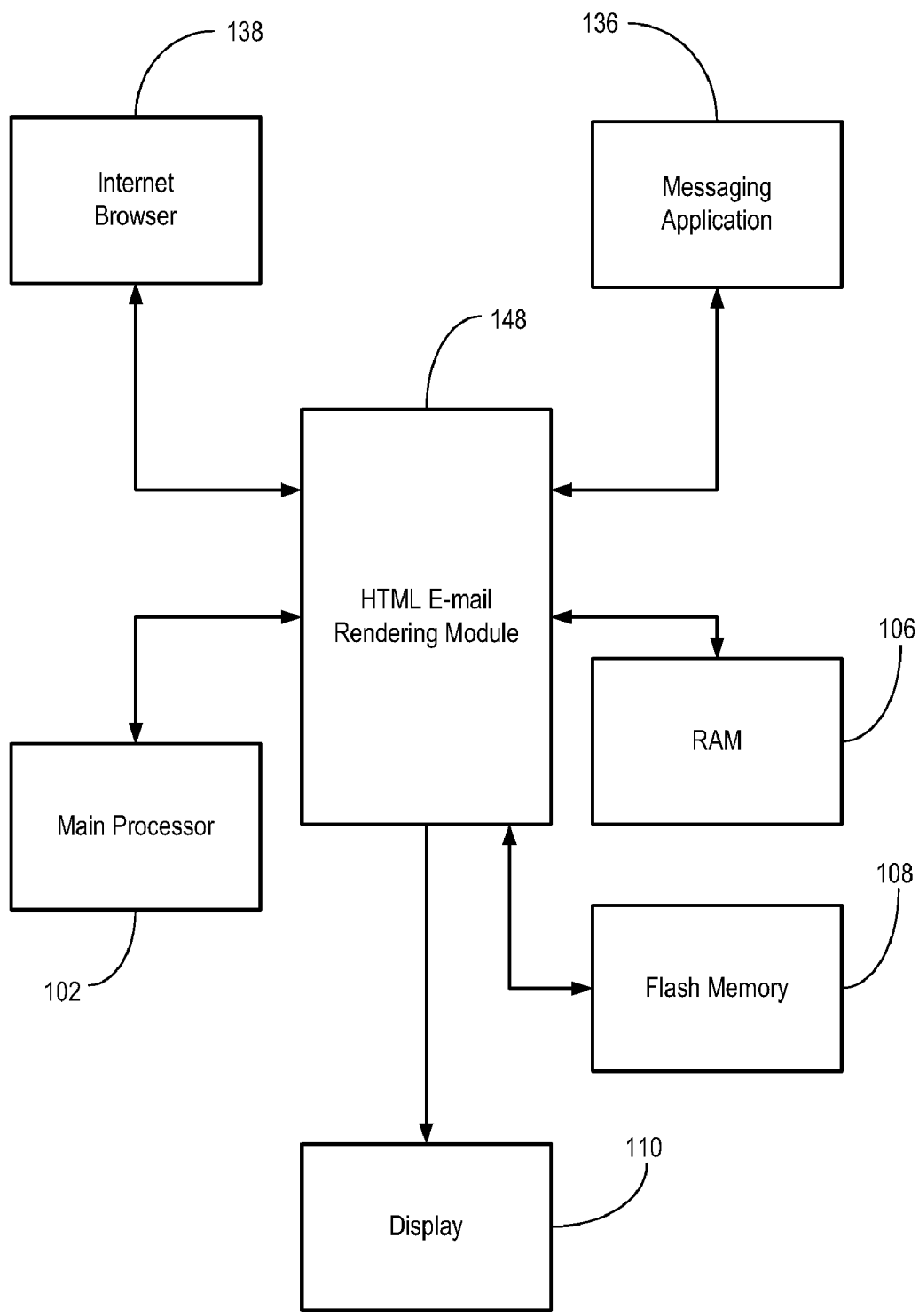

Now referring to FIG. 4B, shown is a schematic block diagram of an illustrative system 400B for processing and rendering HTML e-mail received at the wireless handheld device 100 from device server 310. As shown, system 400B includes various components previously introduced with reference to FIG. 1. In this illustrative example, FIG. 4B more clearly shows an HTML e-mail rendering module 148 operatively connected to or integrated with messaging application 136 and Internet browser 138. The HTML e-mail rendering module 148 is also operatively connected to the main processor 102, RAM 106, flash memory 108, and display 110.

In an embodiment, HTML e-mail preprocessing module 402 on device server 310 may be configured to identify style rules in the <head> section of the HTML code, and may sort them into the order that they are referenced in the HTML document. HTML e-mail preprocessing module 402 may then interleave the identified and sorted style rules into different blocks within the <body> section of the HTML code, such that the interleaved style rules are placed into style sections delimited by <style> and </style> section markers that appear just before each group of rules is referenced by the HTML.

In an embodiment, the style rules are interleaved into different blocks of HTML code which represent different sections of the HTML e-mail to be processed and displayed on device 100. These pre-processed blocks of HTML code representing sections of the HTML e-mail may be variable in size. Their size may be determined by several factors including the amount of visible text in a section of HTML e-mail not counting HTML tags, the number of images referenced by the section of HTML code, and the size of the HTML e-mail sections processed so far.

In an embodiment, various rules may be applied to determine the size of the blocks of HTML code, and their corresponding HTML e-mail sections. For example, the HTML code may be split into sections containing 2 KB of visible text, and each image may be counted as 100 characters, on average. However, rules may be variable and a total limit of 8 KB per block of HTML code might be enforced even if 2 KB of visible text is not available. Another rule that may be applied is a total limit of 64 KB for all sections, for example.

Based on various predetermined rules on maximum block size and interleaving of style rules, each HTML e-mail received by device server 310 may be preprocessed and stored on device server 310 for downloading to device 100. Illustrative examples of predetermined rules for interleaving the style rules are described further below with reference to FIGS. 5 to 9.

Correspondingly, as a counterpart to HTML e-mail preprocessing module 402 on device server 310, HTML e-mail rendering module 148 on device 100 may be configured to identify the preprocessed HTML e-mail downloaded from device server 310 for processing by HTML e-mail rendering module 148 and rendering on display 110.

In an embodiment, for each HTML e-mail preprocessed and stored on device server 310, an e-mail header or a first section of the HTML e-mail may be pushed out to device 100 and appear as a newly received e-mail message in a Message List on display 110. This new e-mail message may include HTML code that when processed and rendered allows a first section of the HTML e-mail to be displayed in the enriched HTML e-mail format. Upon user selection of the e-mail from the Message List for viewing, the HTML e-mail rendering module 148 may be initiated to retrieve the HTML code from the HTML e-mail. Then, using various components of the Internet browser 138, HTML e-mail rendering module 148 processes the HTML code using main processor 102, RAM 106 and any code stored in flash memory 108 as necessary. In an embodiment, the HTML e-mail rendering module 148 may also include a subcomponent that fetches and displays any images referenced by the HTML. For example, the references might be to image attachments, or might be to externally accessible images.

Now referring to FIG. 5, shown is an illustrative example of HTML code 500 that may be preprocessed on device server 310. In this example, rule limits are illustrated. As shown, HTML code 500 includes style rules 502 conventionally placed in the <head> section of the HTML code 500 in a "before" preprocessing state. In this illustrative example, these style rules 502 define various colors that may be used for rendering the HTML e-mail. However, in accordance with an embodiment, style rules 502 may instead be interleaved in the <body> section, as shown by reference numerals 504 and 506. In each case, the style rules may be placed in separate blocks of HTML code in style sections delimited by <style> and </style> section markers.

Placement in different blocks of HTML code allows the style rules to be downloaded to device 100 in sequence. That is, style rules 504 are first downloaded with a first block of HTML code and processed for rendering a first section of the HTML e-mail on display 110 of device 100. Then, if a user requests to view a subsequent section of the HTML e-mail, a second block of HTML code including style rules 506 is downloaded to device 100 for processing and rendering the second section of HTML e-mail.

As will be appreciated, placement of style rules 504 and 506 in different blocks of HTML code provides greater flexibility in processing and rendering the HTML e-mail on device 100 by allowing processing and rendering sessions of the HTML e-mail in sequence. As device 100 may have limited processing and memory resources, processing HTML style rules only for the section of the HTML e-mail to be rendered and displayed next allows the HTML e-mail to be processed and rendered more quickly for improved user experience.

Still referring to FIG. 5, when style rule interleaving is performed as illustrated, a decision must be made regarding the number of style rules to be placed in each separate style section 504, 506. In the present illustrative embodiment, the concept of "rule limits" may be applied, since a wireless handheld device 100 may have a roughly constant overhead for parsing each style rule. For example, enforcing a rule limit bounds the maximum time that the device 100 spends parsing style rules for a given section of visible text. In FIG. 5, there is a limit of six style rules per section (e.g. as shown for style section 504). However, it will be appreciated that any suitable rule limit may be applied such as the maximum number of style rules per style section.

Now referring to FIG. 6, shown is an example of HTML code 600 illustrating the concept of "text limits". As shown, HTML code 600 includes style rules 602 are shown conventionally in the <head> section of the HTML code 600. However, in a preprocessing step completed by the HTML e-mail preprocessing module 402 on the device server 310, the style rules may instead be interleaved in different blocks of HTML code in the <body> section, and placed in corresponding style sections delimited by <style> and </style> section markers as shown by reference numerals 604 and 606.

Once the preprocessed HTML code is downloaded to device 100, similarly to the process described above for FIG. 5, style rules 604 in a first block of HTML code are processed first for rendering a first section of the HTML e-mail. Style rules 606 in the second block of HTML code are processed only if the user requests to view the second section of the HTML e-mail requiring the style rules 606.

Still referring to FIG. 6, this illustrative embodiment performs style rule interleaving based on visible text limits. Here, the idea is that display 110 of device 100 is only able to display a fixed amount of visible text (at the default font size) without scrolling. As such, style sections need only be interleaved at these intervals of visible text. For example, FIG. 6 shows a visible text limit of 256 characters between style sections.

In an embodiment, both the rule limit of FIG. 5 and the text limit of FIG. 6 might be used together to determine the size of the interleaved style sections. That is, for each section of HTML code, whichever of the rule limit and text limit is hit first would determine the size of that interleaved section.

Now referring to FIG. 7, shown is an example of HTML code 700 showing illustrative block and inline elements defining soft rule limits. In FIG. 7, style rules 702 are shown as they would be conventionally restricted for placement in the <head> section of an HTML page. However, in accordance with an embodiment, instead of style rules 702 placed in the <head> section of the HTML code, the style rules may instead be placed in the <body> section as shown by reference numeral 704. This preprocessing step is completed on device server 310 as previous explained.

Still referring to FIG. 7, in this illustrative example the hard rule limit of six style rules per section could not be enforced as previously described by FIG. 5. Interleaving of style rules must take into account HTML block and inline elements. The <span> element is inline, so insertion of a <style> block element at the expected position 706 would change the layout properties of the HTML as decided by the HTML rendering module 148. As a result, the hard rule limit actually needs to be a soft rule limit.

Now referring to FIG. 8, shown is another example of HTML code 800 illustrating a block of HTML code and interleaved style rule elements illustrating soft text limits. As shown, the HTML code includes style rules 802 placed in the <head> section of HTML code 800. As shown, instead of placement in the <head> section, the style rules are interleaved within the <body> section of the HTML code, as shown by reference numerals 804 and 806. Here, the interleaved style rules shown at 804 and 806 are each placed in separate style sections delimited by <style> and </style> section markers. Similar to the soft rule limits of FIG. 7, this example shows that soft text limits are also required. If the 256 character limit is reached in the middle of a block or inline HTML element, a new <style> block cannot be inserted until the next block element begins.

Now referring to FIG. 9, shown is an illustrative example of HTML code including global style rules that may not be interleaved in different blocks of HTML code. In this illustrative example, there are some global style rules 902 defining body and link colours that are used throughout the HTML e-mail. These global styles apply to the entire HTML document, so they cannot be interleaved as previously described. Rather, global style rules 902 must be processed together for displaying the first section of HTML-e-mail. The global style rules then continue to be used for displaying all subsequent sections of the HTML e-mail. On the other hand, normal (i.e. non-global) style rules 904 conventionally placed in the <head> section of the HTML code may be interleaved and placed in the <body> section of the HTML code as shown by reference numeral 906. As previously discussed, these normal styles would still be subject to any hard/soft rule and text limits.

Figure 10A:
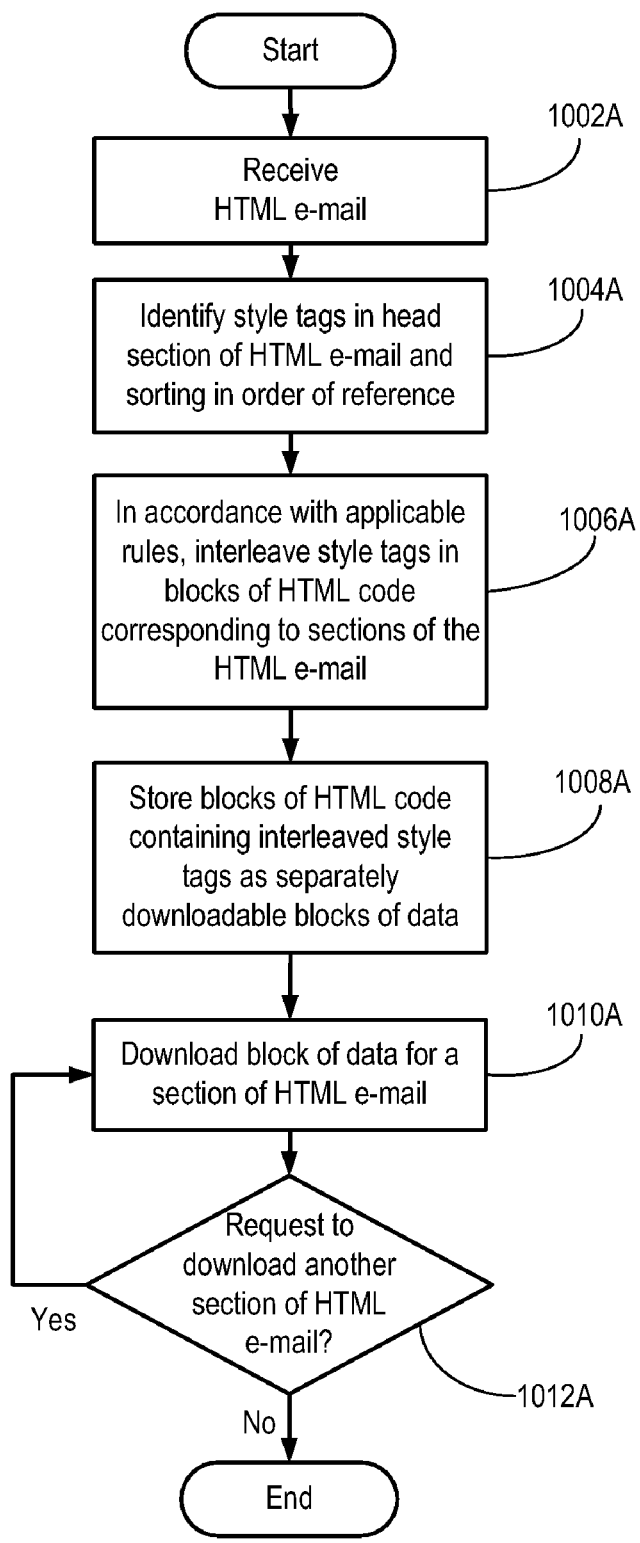
FIGS. 10A and 10B are schematic flowcharts of an illustrative method for processing and rendering HTML e-mail in accordance with an embodiment.

Now referring to FIG. 10A, shown as a schematic flowchart of a method 1000A in accordance with an embodiment. As shown, method 1000A begins and at block 1002A receives an HTML e-mail (e.g. at device server 310).

Method 1000A then proceeds to block 1004A, where method 1000A identifies style tags in the head section of the HTML e-mail.

Method 1000A then proceeds to block 1006A where, in accordance with various applicable rules as described above, the style tags are interleaved in different blocks of HTML code corresponding to different sections of the HTML e-mail.

Method 1000A then proceeds to block 1008A, where method 1000A stores the blocks of HTML code containing interleaved style tags as separately downloadable blocks of data.

Method 1000A then proceeds to block 1010A, where method 1000 downloads a block of data for a section of the HTML e-mail.

Method 1000A then proceeds to decision block 1012A, where method 1000A determines if there is a request for another session of the HTML e-mail to be downloaded. If yes, method 1000A returns to block 1010A. Otherwise, method 1000A ends.

Figure 10B:
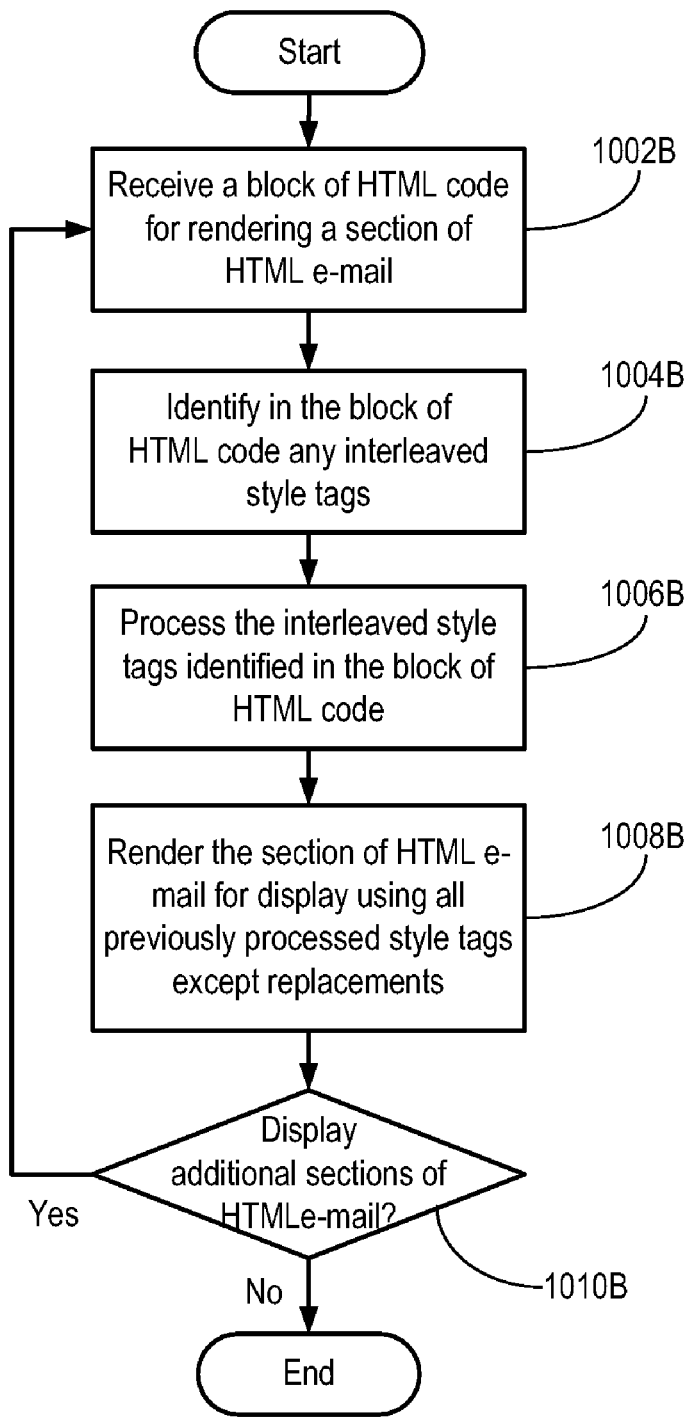

Now referring to FIG. 10B, shown is a schematic flowchart of a method 1000B in accordance with an embodiment. As shown, method 1000B begins and at block 1002B receives a block of HTML code for rendering a section of HTML e-mail.

Method 1000B then proceeds to block 1004B, where method 1000B identifies in the block of HTML code and any interleaved style rules. It should be appreciated that a single block of downloaded HTML may contain multiple interleaved style blocks, since the limits governing the sizes of HTML blocks may differ from the limits governing the sizes of style blocks.

Method 1000B and proceeds to block 1006B, where method 1000B processes the interleaved style rules identified in the block of HTML code at block 1004B.

Method 1000B then proceeds to block 1008B, where method 1000B renders the section of HTML e-mail for display, using all previously processed style rules. However, if any of the previously processed outtakes have been replaced by a subsequent style rule, the replacement is used instead.

Method 1000B then proceeds to decision block 1010B, where method 1000B determines whether the user wishes to display additional sections of the HTML e-mail. For example, the user may select a "More" command to view the next section of the HTML e-mail. Alternatively, an "Auto More" function may be selected such that scrolling to the very bottom of the last rendered section of HTML e-mail automatically initiates downloading and rendering of the next section of the HTML e-mail. If yes, method 1000B returns to block 1002B. Otherwise, method 1000B ends.

In an embodiment, as the sections of HTML e-mail are processed and rendered, the sections are attached to previously rendered sections, such that a contiguous HTML e-mail is formed. Using navigation controls on device 100, such as trackball 117, the HTML e-mail may then be scrollable from the beginning to the last rendered section.

While the interleaving of style rules has been described in the context of HTML formatted e-mail messages and styles, the teachings of the present disclosure may be applied to any kind of markup language that separates presentation ("styling") information from content, such as both the Standard Generalized Markup Language (SGML)-based HTML specification and the XML-based HTML specification (also referred to as Extensible HyperText Markup Language or XHTML), and to other documents written in HTML and other kinds of Extensible Markup Language (XML) document.

The teachings may also be applied to these markup languages in a non-e-mail context. For example, on a mobile device that displays HTML-based web pages, the interleaving of style rules would provide a benefit since the entire web page may not be displayed on the mobile screen at once. Only the style rules applicable to the visible text need to be processed by the Internet browser module 138.

Thus, in an embodiment, there is provided a method of processing a markup language electronic mail (e-mail), comprising: (i) identifying in a head section of markup language code any style rules for rendering the markup language based e-mail and sorting the style rules in order of reference in the markup language code; (ii) in dependence upon predetermined rules, interleaving the style rules for placement in a body section of one or more blocks of markup language code corresponding to one or more sections of the markup language e-mail; and (iii) storing the one or more blocks of markup language code including the interleaved style rules as separately downloadable blocks of data corresponding to sections of the markup language based e-mail.

In an embodiment, the method further comprises: (iv) receiving at a mobile communication device a block of markup language code for rendering a section of the markup language based e-mail on a display; (v) identifying in the block of markup language code any style rules interleaved therein for rendering the section of the markup language based e-mail on the display; (vi) processing the interleaved style rules identified in the block of markup language code; and (vii) rendering the section of the markup language based e-mail on the display using the processed style rules.

In another embodiment the method further comprises: (viii) repeating (iv) to (vii) for subsequent blocks of markup language code received at the mobile communication device for rendering subsequent sections of the markup language based e-mail on the display.

In another embodiment, the markup language is one of HyperText Markup Language (HTML), Standard Generalized Markup Language based HTML, Extensible HyperText Markup Language or (XHTML), and Extensible Markup Language (XML).

In another embodiment, the subsequently rendered sections of the markup language based e-mail are attached to previously rendered sections of the markup language based e-mail to display a contiguous, scrollable markup language e-mail.

In another embodiment, the method further comprises processing global style rules interleaved in the first block of markup language code, and applying the global style rules to all subsequent blocks of markup language code.

In another embodiment, the method further comprises interleaving style rules in subsequent blocks of markup language code to replace style rules interleaved in earlier blocks of markup language code.

In another embodiment, rendering each subsequent section of the markup language e-mail comprises applying all previously processed or replaced style rules applicable to the corresponding block of markup language code.

In another aspect, there is provided a system for processing a markup language electronic mail (e-mail), the system adapted to: (i) identify in a head section of markup language code any style rules for rendering the markup language based e-mail and sorting the style rules in order of reference in the markup language code; (ii) in dependence upon predetermined rules, interleave the style rules for placement in a body section of one or more blocks of markup language code corresponding to one or more sections of the markup language e-mail; and (iii) store the one or more blocks of markup language code including the interleaved style rules as separately downloadable blocks of data corresponding to sections of the markup language based e-mail.

In an embodiment, the system is further adapted to: (iv) receive at a mobile communication device a block of markup language code for rendering a section of the markup language based e-mail on a display; (v) identify in the block of markup language code any style rules interleaved therein for rendering the section of the markup language based e-mail on the display; (vi) process the interleaved style rules identified in the block of markup language code; and (vii) render the section of the markup language based e-mail on the display using the processed style rules.

In another embodiment, the system is further adapted to: (viii) repeat (iv) to (vii) for subsequent blocks of markup language code received at the mobile communication device for rendering subsequent sections of the markup language based e-mail on the display.

In another embodiment, the markup language is one of HyperText Markup Language (HTML), Standard Generalized Markup Language based HTML, Extensible HyperText Markup Language or (XHTML), and Extensible Markup Language (XML).

In another embodiment, the system is further adapted to attach subsequently rendered sections of the markup language based e-mail to previously rendered sections of the markup language based e-mail to display a contiguous, scrollable markup language e-mail.

In another embodiment, the system is further adapted to interleave global style rules in the first block of markup language code, and apply the global style rules to all subsequent blocks of markup language code.

In another embodiment, the system is further adapted to interleave style rules in subsequent blocks of markup language code to replace style rules interleaved in earlier blocks of markup language code.

In another embodiment, the system is further adapted to render each subsequent section of the markup language e-mail by applying all previously processed or replaced style rules applicable to the corresponding block of markup language code.

In another aspect, there is provided a data processor readable medium storing data processor code that when loaded into a device adapts the device to process a markup language electronic mail (e-mail), the data processor readable medium comprising: (i) code for receiving at a mobile communication device a block of markup language code for rendering a section of the markup language based e-mail on a display; (ii) code for identifying in the block of markup language code any style rules interleaved therein for rendering the section of the markup language based e-mail on the display; (iii) code for processing the interleaved style rules identified in the block of markup language code; and (iv) code for rendering the section of the markup language based e-mail on the display using the processed style rules.

In an embodiment, the data processor medium further comprises: (v) code for repeating (i) to (iv) for subsequent blocks of markup language code received at the mobile communication device for rendering subsequent sections of the markup language based e-mail on the display.

In another embodiment, the markup language is one of HyperText Markup Language (HTML), Standard Generalized Markup Language based HTML, Extensible HyperText Markup Language or (XHTML), and Extensible Markup Language (XML).

In another embodiment, the data processor readable medium further comprises code for attaching subsequently rendered sections of the markup language based e-mail to previously rendered sections of the markup language based e-mail to display a contiguous, scrollable markup language e-mail.

In another embodiment, the data processor readable medium further comprises code for processing global style rules interleaved in the first block of markup language code, and applying the global style rules to all subsequent blocks of markup language code.

In another embodiment, the data processor readable medium further comprises code for interleaving style rules in subsequent blocks of markup language code to replace style rules interleaved in earlier blocks of markup language code.

In another embodiment, the data processor readable medium further comprises code for rendering each subsequent section of the markup language e-mail comprises applying all previously processed or replaced style rules applicable to the corresponding block of markup language code.

While illustrative embodiments have been described above, it will be appreciated that various changes and modifications may be made. More generally, the scope of the invention is defined by the following claims.

What is claimed is:

1. A method of processing a markup language based electronic mail (e-mail), comprising:
   identifying, in a head section of markup language code, any style rules for rendering the markup language based e-mail and sorting the style rules in order of reference in the markup language code;
   interleaving the style rules for placement in a body section of one or more blocks of markup language code corresponding to one or more sections of the markup language based e-mail, wherein interleaving is based on predetermined rules;
   storing the one or more blocks of markup language code including the interleaved style rules as separately downloadable blocks of data corresponding to sections of the markup language based e-mail;
   receiving, at a mobile communication device, a block of markup language code for rendering a section of the markup language based e-mail on a display;
   identifying, in the block of markup language code, any style rules interleaved therein for rendering the section of the markup language based e-mail on the display;
   processing the interleaved style rules identified in the block of markup language code; and
   rendering the section of the markup language based e-mail on the display based on the processed style rules.

2. The method of claim 1, further comprising:
   receiving, at the mobile communication device, a subsequent block of markup language code for rendering a subsequent section of the markup language based e-mail on a display;
   identifying, in the subsequent block of markup language code, any style rules interleaved therein for rendering the subsequent section on the display;
   processing the interleaved style rules identified in the subsequent block of markup language code; and
   rendering the subsequent section of the markup language based e-mail on the display based on the processed style rules.

3. The method of claim 2, wherein the markup language is one of HyperText Markup Language (HTML), Standard Generalized Markup Language based HTML, Extensible HyperText Markup Language (XHTML), and Extensible Markup Language (XML).

4. The method of claim 2, wherein the subsequent section of the markup language based e-mail is attached to previously rendered sections of the markup language based e-mail to display a contiguous, scrollable markup language based e-mail.

5. The method of claim 2, comprising processing global style rules interleaved in the first block of markup language code, and applying the global style rules to all subsequent blocks of markup language code.

6. The method of claim 2, comprising replacing at least one style rule from previously processed blocks of markup language code with at least one style rule identified in the subsequent block of markup language code.

7. The method of claim 2, wherein rendering each subsequent section of the markup language based e-mail is based on all previously processed or replaced style rules applicable to the corresponding block of markup language code.

8. A system for processing a markup language based electronic mail (e-mail), the system comprising a mobile communication device that comprises a display, a memory, and a processor, the system adapted to:
   identify, in a head section of markup language code, any style rules for rendering the markup language based e-mail and sorting the style rules in order of reference in the markup language code;
   interleave the style rules for placement in a body section of one or more blocks of markup language code corresponding to one or more sections of the markup language based e-mail, wherein interleaving is based on predetermined rules; and
   store the one or more blocks of markup language code including the interleaved style rules as separately downloadable blocks of data corresponding to sections of the markup language based e-mail;

wherein the processor of the mobile communication device executes computer readable code stored in the memory to:

receive a block of markup language code for rendering a section of the markup language based e-mail on the display;

identify, in the block of markup language code, any style rules interleaved therein for rendering the section of the markup language based e-mail on the display;

process the interleaved style rules identified in the block of markup language code; and render the section of the markup language based e-mail on the display based on the processed style rules.

9. The system of claim 8, wherein the processor of the mobile communication device executes computer readable code to:

receive a subsequent block of markup language code for rendering a subsequent section of the markup language based e-mail on the display;

identify, in the subsequent block of markup language code, any style rules interleaved therein for rendering the subsequent section of the markup language based e-mail on the display;

process the interleaved style rules identified in the subsequent block of markup language code; and render the subsequent section of the markup language based e-mail on the display using the processed style rules.

10. The system of claim 9, wherein the markup language is one of HyperText Markup Language (HTML), Standard Generalized Markup Language based HTML, Extensible HyperText Markup Language (XHTML), and Extensible Markup Language (XML).

11. The system of claim 9, wherein the system is further adapted to attach the subsequent section of the markup language based e-mail to previously rendered sections of the markup language based e-mail to display a contiguous, scrollable markup language based e-mail.

12. The system of claim 9, wherein the system is further adapted to interleave global style rules in the first block of markup language code, and apply the global style rules to all subsequent blocks of markup language code.

13. The system of claim 9, wherein the processor of the mobile communication device executes computer readable code to replace at least one style rule from previously processed blocks of markup language code with at least one style rule identified in the subsequent block of markup language code.

14. The system of claim 9, wherein the processor of the mobile communication device executes computer readable code to render each subsequent section of the markup language based e-mail based on all previously processed or replaced style rules applicable to the corresponding block of markup language code.

15. A data processor readable medium storing data processor code executable by a processor to:

receive a block of markup language code for rendering a section of a markup language based e-mail on a display;

identify in the block of markup language code any style rules interleaved therein for rendering the section of the markup language based e-mail on the display;

process the interleaved style rules identified in the block of markup language code;

render the section of the markup language based e-mail on the display based on the processed style rules;

receive a subsequent block of markup language code for rendering a subsequent section of the markup language based e-mail on a display;

identify, in the subsequent block of markup language code any style rules interleaved therein for rendering the subsequent section of the markup language based e-mail on the display;

process the interleaved style rules identified in the subsequent block of markup language code; and render the subsequent section of the markup language based e-mail on the display based on the processed style rules.

16. The data processor readable medium of claim 15, wherein the markup language is one of HyperText Markup Language (HTML), Standard Generalized Markup Language based HTML, Extensible HyperText Markup Language (XHTML), and Extensible Markup Language (XML).

17. The data processor readable medium of claim 15, wherein the data processor code is executable by the processor to attach the subsequent section of the markup language based e-mail to previously rendered sections of the markup language based e-mail to display a contiguous, scrollable markup language based e-mail.

18. The data processor readable medium of claim 15, wherein the data processor code is executable by the processor to process global style rules interleaved in the first block of markup language code, and applying the global style rules to all subsequent blocks of markup language code.

19. The data processor readable medium of claim 15, wherein the data processor code is executable by the processor to replace at least one style rule-from previously processed blocks of markup language code with at least one style rule identified in the subsequent block of markup language code.

20. The data processor readable medium of claim 15, wherein the data processor code is executable by the processor to render each subsequent section of the markup language based e-mail based on all previously processed or replaced style rules applicable to the corresponding block of markup language code.

* * * * *